United States Patent [19]

Kambayashi et al.

[11] Patent Number: 4,683,552

[45] Date of Patent: Jul. 28, 1987

[54] SYSTEM FOR ON-LINE AND OFF-LINE DISPLAY

[75] Inventors: Hiroaki Kambayashi; Yasuyuki Okada, both of Sagamihara, Japan

[73] Assignee: Hitachi, Ltd., Tokyo, Japan

[21] Appl. No.: 603,825

[22] Filed: Apr. 25, 1984

[30] Foreign Application Priority Data

Apr. 27, 1983 [JP] Japan .................................. 58-72861

[51] Int. Cl.[4] .............................................. G06F 3/023

[52] U.S. Cl. ..................................................... 364/900

[58] Field of Search ... 364/200 MS File, 900 MS File; 340/750, 797; 235/379, 380

[56] References Cited

U.S. PATENT DOCUMENTS

| | | | |
|---|---|---|---|
| 3,798,633 | 3/1974 | Hofstein | 340/797 |
| 4,115,765 | 9/1978 | Hartke | 340/750 |
| 4,234,931 | 11/1980 | Kanaiwa | 364/900 |
| 4,454,414 | 6/1984 | Benton | 235/379 |
| 4,464,733 | 8/1984 | Misker | 235/379 |

OTHER PUBLICATIONS

"Bildverarbeitende Systeme" Dipl.-Ing. Walter Tengler, Elektronic, 1980, Heft 21, pp. 107–114.

*Primary Examiner*—Archie E. Williams, Jr.
*Assistant Examiner*—Emily Yue Chan
*Attorney, Agent, or Firm*—Antonelli, Terry & Wands

[57] ABSTRACT

A display system operates to display characters, graphics and picture images in connection with a host computer in online mode in which character data is treated in the online display data form, and without connection of the host computer in offline mode in which character data is treated in the offline display form. Character data supplied for the online operation is converted into the offline display data form and stored for use in offline mode, or it is first stored and then converted when used in offline mode.

2 Claims, 4 Drawing Figures

SYSTEM FOR ON-LINE AND OFF-LINE DISPLAY

BACKGROUND OF THE INVENTION

The present invention relates to a display system and, particularly, to a display system used in the online mode in which the system is linked to a computer and also in the offline mode in which the system is operated independently of the computer.

Many of the conventional display systems capable of displaying characters, graphics and picture images employ the following method of display. For displaying characters and special symbols coded in 1-byte or 2-byte words (will be called character data hereinafter), the display system incorporates a character generator which generates fonts and symbolic patterns corresponding to the characters and symbols as video signals, which are fed to the picture tube for display in synchronism with the timing of the raster. On the other hand, for command data used to display graphics in the form of vectors (the command data will be called graphic data hereinafter), and for bit-variable data which does not have any of the above-mentioned forms (the bit-variable data will be called image data hereinafter), a full dot memory stores the corresponding or converted dot patterns temporarily in correspondence to the dot position, of the picture tube and, thereafter, the video signal is generated based on the dot patterns in the full dot memory and is fed to the picture tube for display in synchronism with the timing of the raster.

The display system is used in the online mode and in the offline mode. In the online mode, the display system is linked to a host computer so that display data, including character data, graphic data and image data, is displayed on the picture tube of the display system under control of the computer. In the offline mode, the display system is disconnected from the host computer, and display data is entered through an input unit, such as a keyboard associated with the display system, to produce offline pictures which will be stored in the external memory units associated with the display system, or displayed on the picture tube for the purpose of modification or addition by using the keyboard, or outputted to an output unit, such as a printer, associated with the display system.

For online pictures displayed in the online mode, there have been established several standards for the number of characters displayed on one line and the number of characters displayed in one frame. One example of such standards specifies that the character size is 24-by-24 dots, the character pitch is 28 dots along the line, the vertical line pitch is 30 dots, and a 1120-by-720 dot display area is used to display 24 lines by 40 characters/line.

For offline pictures, which are mostly the cases of making documents in the offline mode, character data is usually converted so as to be treated as image data. For example, the character size is 24-by-24 dots and the horizontal character pitch is accorded with the byte boundary such as 32 bits for the convenience of expanding the character fonts on the full dot memory, and the expanded data is contracted to a half in size so that it is stored in the full dot memory at a maximum of 65 characters/line. The character data thus expanded in the form of image data on the full dot memory can be displayed on the picture tube or stored on the disk memory unit associated with the display system.

As mentioned above, online pictures and offline pictures, in many cases, have different display forms such as the character size, horizontal character pitch and vertical character pitch. On this account, online character data stored on a storage medium such as a floppy disk is not readily available for processing in the offline environment. That is, an online picture and an offline picture cannot conveniently be composed on the same screen because of their different display forms, such as the character pitch as mentioned above. One method of solving this problem is that the online character data is converted to the dot patterns of its font which are expanded in the full dot memory as the image data in accordance with the offline picture form and, thereafter, the image data is read out from the full dot memory to be displayed on the picture tube, even during the online operation, instead of displaying the character data directly on the picture tube through hard-wired circuits. This method, however, disadvantageously sacrifices the display speed for character data when the display system is operated under the online environment.

SUMMARY OF THE INVENTION

It is an object of the present invention to overcome the above-mentioned problems and provide a display system which allows for easy use of online display data during the offline mode through the transformation of the online display data to the offline form.

The present invention resides characteristically in a display system having different display forms of character data in the online and offline operations as described above, comprising memory means, display means for displaying information, and control means which operates to display character data in the online display form on the display means and also to store the character data in the offline display form in the memory means.

The present invention also resides characteristically in a display system having different display forms of character data in the online and offline operations as described above, comprising memory means, display means for displaying information, and a control means which operates to display character data in the online display form on the display means when the system is run in the online mode and at the same time to store the character data in the memory means so that it is retrieved from the memory means and displayed in the transformed offline display form on the display means when the system is run in the offline mode.

DESCRIPTION OF THE PREFERRED EMBODIMENTS

Figure 1:
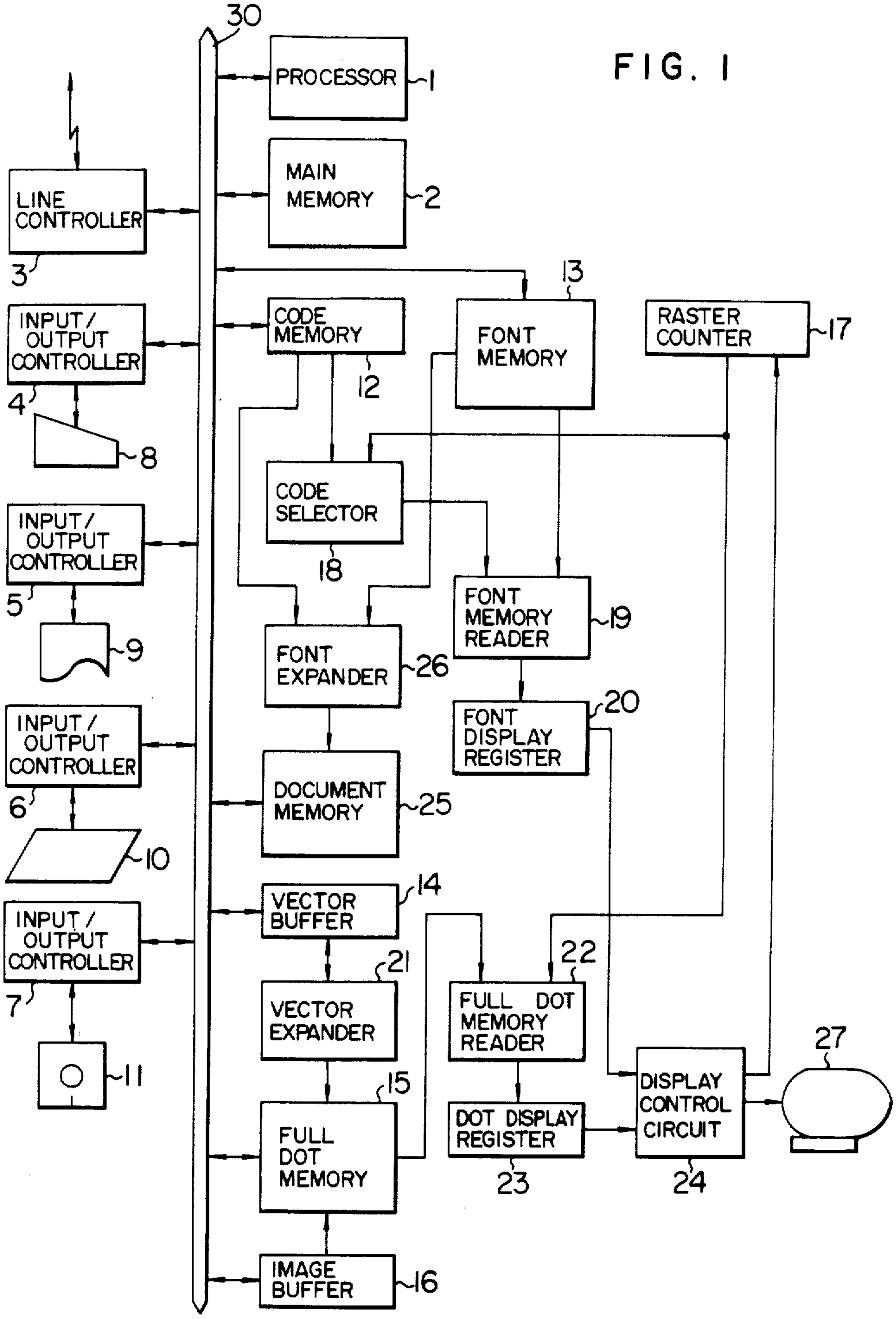
FIG. 1 is a block diagram showing one embodiment of the present invention.

One embodiment of the present invention will now be described with reference to FIGS. 1, 2, 3 and 4. FIG. 1 is a block diagram showing the flow of information among constituents of the display system. In the figure, processor 1 is, for example, a microprocessor, controlling the overall system by executing a program stored in a main memory 2, which also stores data related to the program. Line controller 3 functions to control data transfer between the display system and a host computer which is connected to the system. Input/output controllers, 4, 5, 6 and 7 operate to control an image scanner 8, printer 9, keyboard 10 and disk memory unit 11, respectively. Components 12 through 24 constitute a controller for displaying characters, graphics and picture images on a picture tube 27. Among those, the code memory 12 stores coded character data for one frame including characters and special symbols, the font memory 13 is of a read-only or rewritable type memory for storing fonts of characters and special symbols in the form of dot patterns, and the font memory reading circuit 19 reads out fonts from the font memory 13. The font memory 13 and font memory reading circuit 19 in combination may be called a character generator. The font display register 20 latches fonts read out of the font memory 13, the vector buffer 14 stores graphic data, the vector expansion circuit 21 analyzes graphic data in the vector buffer 14 and expands the data of the vector form into that of the dot form, and the image buffer 16 stores image data. The full dot memory 15 stores both dot data provided by the vector expansion circuit 21 and image data taken out of the image buffer 16 in the memory position corresponding to the dot position on the picture tube, and it has a capacity of, for example, 1120-by-720 dots of display information. The dot display register 23 latches dot data read out of the full dot memory 15, the raster counter 17 counts the number of raster position, and the display control circuit 24 provides the picture tube 27 with synchronizing signals and video signals. A common bus 30 is provided for transferring information among the processor 1, main memory 2, line controller 3, input/output controllers 4, 5, 6 and 7, code memory 12, font memory 13, vector buffer 14, full dot memory 15, image buffer 16, and document memory 25 which will be explained later. All of individual constituents described above are within the scope of the prior art.

Figure 3:
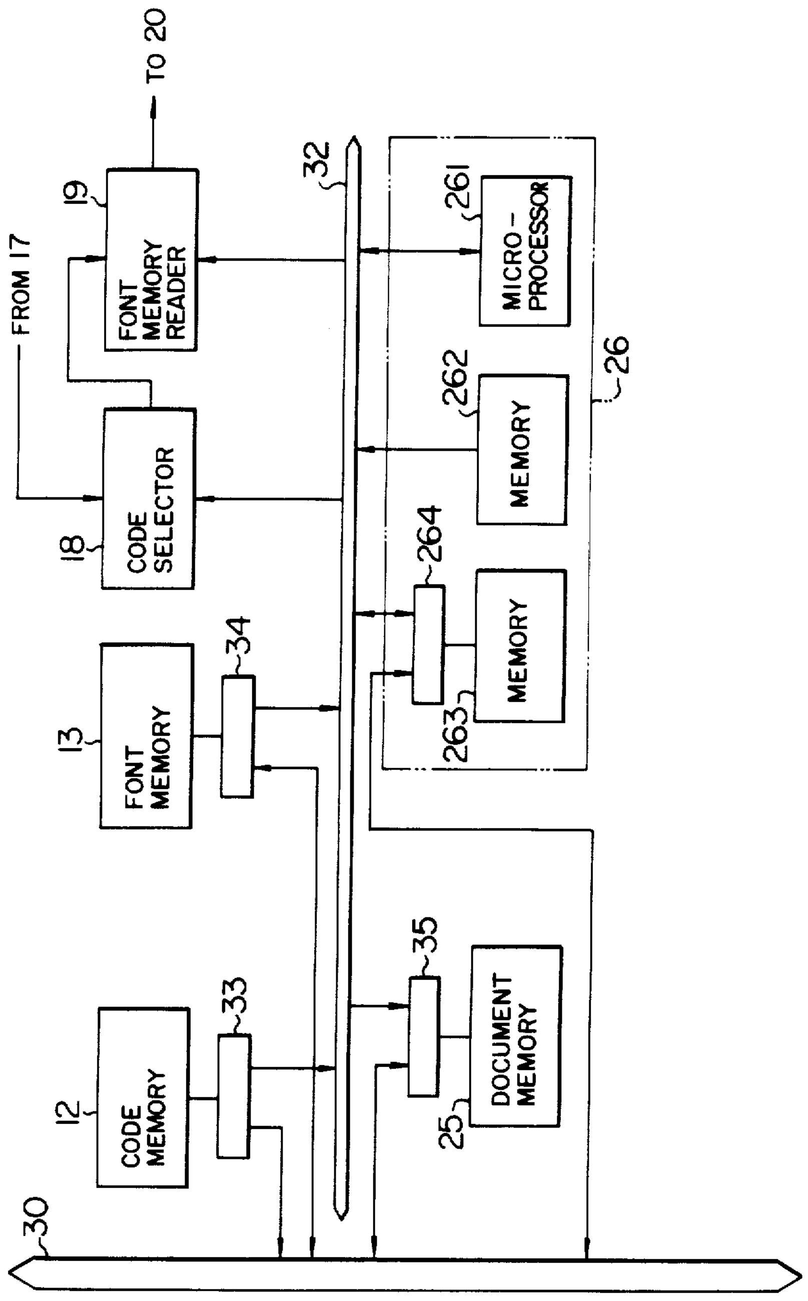
FIG. 3 is a block diagram showing in detail part of the system arrangement shown in FIG. 1.

Next, the document memory 25 and font expander 26, which are essential to this invention, will be described in detail. The document memory 25 has a capacity of, for example, 1728-by-2200 dots of information for storing dot information by a page of document for use in offline processing. The font expander 26 reads out a character code from the code memory 12 and reads out fonts corresponding to the code from the font memory 13, and then stores the font in the form of image data into the document memory 25. FIG. 3 shows in a detailed block form the interconnections among the code memory 12, font memory 13, code selection circuit 18, font memory reading circuit 19, and the like, and also the connection of these components with the common bus 30. A bus 32 shown in FIG. 3 is provided separately from the common bus 30. Multiplexers 33 and 34 are provided for the code memory 12 and font memory 13, respectively, for selecting one of the memory access requests issued through the buses 30 and 32. The code selection circuit 18 transforms information related to the character display position received from the raster counter 17 into the address of the code memory 12, and reads out a character code from the code memory 12 using the address through the bus 32 to be sent to the font memory reading circuit 19. The font memory reading circuit 19 generates an address of the font memory 13 on the basis of the character code given by the code selection circuit 18, and reads out dot patterns for one character code from the font memory 13 using the address through the bus 32 and sends them to the font display register 20. Both of the code selection circuit 18 and font memory reading circuit 19 are well known within the art.

The font expander 26 consists of a microprocessor 261, a read-only memory 262 and a read/write memory 263 associated with the microprocessor 261. A multiplexer 264 is provided for the read/write memory 263 for selecting one of the memory access requests issued through the bus 30 and issued by the microprocessor 261 through the bus 32. Another multiplexer 35 is, provided for the document memory 25 for selecting one of the memory access requests issued through the bus 30 and issued by the microprocessor 261 through the bus 32. The microprocessor 261 makes access to the code memory 12 and font memory 13, and if memory access requests are issued coincidently by the microprocessor 261 and the code selection circuit 18 or font memory reading circuit 19, the request from the code selection circuit 18 or font memory reading circuit 19 takes precedence over the request from the microcomputer 261 under control of the multiplexers 33 and 34.

The operation of the foregoing system arrangement for displaying character data, graphic data and image data in the online mode will be described. The character display operation will be explained first. Character data sent over a communication line and character data entered through the keyboard 10 are fed via the line controller 3 and input/output controller 6 and delivered through the bus 30 to the main memory 2 under control of the processor 1. The processor 1 performs editing for the character data in the main memory 2 and transfers the edited data to the code memory 12. The character data stored in the code memory 12 causes the code selection circuit 18 to select a character code or symbolic code in correspondence to the display position in accordance with the contents of the raster counter 17. Then, character fonts or a symbolic pattern corresponding to the code is read out from the font memory 13 in response to the signal issued by the font memory reading circuit 19 and loaded into the font display register 20. The contents of the font display register 20 are shifted following the display synchronizing signal from the display control circuit 24 for the picture tube 27 and sent as a video signal to the picture tube 27. Character fonts or a symbolic pattern stored in the font memory 13 may have been transferred from the main memory 2 under control of the processor 1 instead of the read-only type of font memory detached from the processor.

Next, the display operation for graphic data and image data will be described. Graphic data sent over the communication line is fed via the line controller 3 and delivered through the bus 30 to the main memory 2 under control of the processor 1. The processor 1 operates on the graphic data in the main memory 2 and transfers the data to the vector buffer 14. Graphic data loaded into the vector buffer 14 is expanded into dot data by the control of the vector expansion circuit 21 and stored in the full dot memory 15. Whereas, image data sent over the communication line and image data entered through the image scanner 8 are fed respectively via the line controller 3 and input/output controller 4 and delivered through the bus 30 to the main memory 2 under control of the processor 1. The processor 1 operates on the data in the main memory 2 and performs the expansion process if it is compressed data, and then transfers the data to the image buffer 16. The image data loaded into the image buffer 16 is then stored in address locations of the full dot memory 15 in correspondence to the display position. Then, the dot data stored in the full dot memory 15 is read out in response to the contents of the raster counter 17 and loaded into the dot display register 23 under control of the full dot memory reading circuit 22. The contents of the dot display register 23 are shifted following the display synchronizing signal from the display control circuit 24 and sent as a video signal to the picture tube 27 as in the case of character display.

Next, the operation related to the document memory 25 and font expander 26 will be described. As described above, when the system is operated in the online mode, the processor 1 transfers character data in the main memory 2 to the code memory 12, and upon completion of transfer the processor 1 issues the offline expansion start command to a certain area of the memory 263. The memory 263 stores the necessary program run by the microprocessor 261, and also reserves certain address areas to be used as an address counter C1 which holds the address of the code memory 12, a data register R1 which holds character data read out of the code memory 12, an address counter C2 which holds the address of the font memory 13, a data register R2 which holds a dot pattern read out of the font memory 13, and an address counter C3 which holds the address of the document memory 25. The microprocessor 261 tests the above-mentioned area for the offline expansion start command under control of the program in the memory 263, and commences the following operation when the command is detected.

The microprocessor 261 reads out a character code from the code memory 12 to the data register R1 and generates an address of the font memory 13 on the basis of the code, then stores it in the address counter C2. This address is used to read out the first dot pattern line for the character code from the font memory 13, and it is stored in the data register R2. The dot pattern is transferred to the document memory 25 addressed by the contents of the address register C3. Then, the microprocessor 261 increments the address counter C2 for the font memory 13 and the address counter C3 for the document memory 25 and reads out the next dot pattern line for the same character code to the data register R2, then transfers the dot pattern to a new location of the document memory 25.

After all dot patterns for one complete character have been transferred from the font memory 13 via the memory 263 to the document memory 25, the address counter C1 for the code memory 12 is incremented, and the above operations are repeated for the next character code. After all character codes in the code memory 12 have been converted into dot patterns and expanded into the document memory 25, the microprocessor 261 sets the operation end code to a certain location of the memory 263 to indicate the completion of offline expansion to the processor 1.

Figure 4:
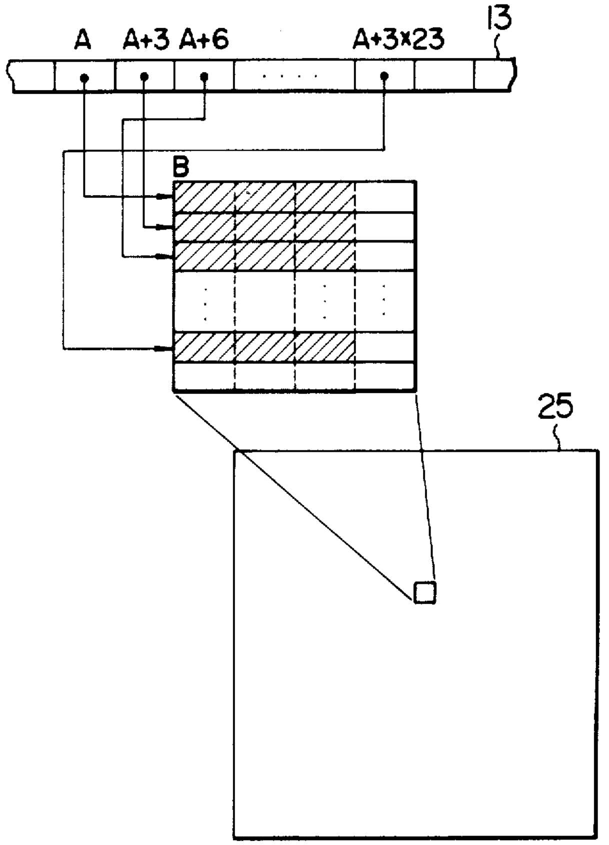
FIG. 4 is a diagram used to explain the relationship between the font memory and the document memory shown in FIGS. 1 and 3.

FIG. 4 illustrates the operation of expanding dot patterns in the font memory 13 into the document memory 25 via the memory 263. The document memory 25 reserves an area of 4-by-4 bytes for each character which is composed of dot patterns of 24-by-24 dots. Each character is made up of 24 dot pattern row segments, each having 3-byte length. The font memory 13 stores dot patterns of each character in such a manner as the first dot pattern line is placed in addresses A to A+2, the next line in addresses A+3 to A+5, and so on. Provided that the document memory 25 has a capacity to store 1728 dots (216 bytes) by 2200 dots (275 bytes) of information, the first dot pattern line of one character stored in an area starting from address A in the font memory 13 is read out as 3-byte data, and after the data have been loaded temporarily into the data register R2 within the memory 263, they are stored in a 3-byte area starting from address B in the document memory 25 under control of the program in the memory 263. The next line starting from address A+3 in the font memory 13 is read out as 3-byte data and stored in a 3-byte area starting from address B+216 in the document memory 25. The next 3-byte data from address A+(3×2) in the font memory 13 are stored in a 3-byte area starting from address B+(216×2) in the document memory 25. In this way, the last pattern line of the character starting from address A+(3×23) in the font memory 13 is read out as 3-byte data to a 3-byte area starting from address B+(216×23) in the document memory 25.

The operation of the font expander 26 described above takes place independently of and concurrently with the character data display operation mentioned earlier. Namely, after character data has been entered via the communication line or through the keyboard 10 and transferred through the main memory 2 to the code memory 12 following the editing operation by the processor 1, the code selection circuit 18 reads out the data from the code memory 12, the reading circuit 19 reads out fonts corresponding to the character code from the font memory 13, and the display control circuit 24 transforms the fonts into a corresponding video signal so that the character is displayed on the picture tube 27, while at the same time the font expander 26 transforms a code of character data in the code memory 12 into corresponding fonts and stores them in the document memory 25. By choosing the timing of reading information from the code memory 12 and font memory 13 by the font expander 26 appropriately, it is possible to retain the speed of reading out information from the code memory 12 and font memory 13 by the code selection circuit 18 and font reading circuit 19. Accordingly, character data can be displayed at the same speed in the online mode as the conventional system.

After all character data in the code memory 12 have been expanded into dot patterns in the document memory 25 by the operation of the font expander 26, all dot data in the document memory 25 is stored via the main memory 2 to the disk memory unit 11 under control of the processor 1. In case graphic data or image data displayed in the online mode is copied to an offline picture, the graphic data or image data expanded into dot patterns in the full dot memory 15 is read out into the document memory 25 under control of the processor 1.

Thus, all display data stored in the disk memory unit 11 exist as image data, and data in the forms of character data and graphic data are not included at all. It is possible for the processor 1 to operate on the display data of the offline picture form for the partial extraction, movement, copying, composition, expansion, contraction, rotation, and the like. It is possible for the succeeding online processing to read out the thus manipulated image data or original image data from the disk memory unit 11 via the main memory 2 to be written into the full dot memory 15 so that the preserved image data is overlaid on the online picture.

The vector expansion circuit 21 can also be arranged by employment of a dedicated microprocessor to operate independently of the processor 1 and other circuits, so that conversion and expansion of graphic data into dot patterns in the full dot memory 15 are carried out at a higher speed.

Next, the offline display operation by the foregoing system arrangement for character data, graphic data and image data will be described. The image data stored in the disk memory unit 11 is transferred via the input/output controller 7 and through the bus 30 to the main memory 2 under control of the processor 1. Then, the processor 1 transfers the data in the main memory 2 to the image buffer 16. The image data loaded into the image buffer 16 is written to the full dot memory 15 addressed in correspondence to the display position. Then, the image data stored in the full dot memory 15 is displayed through the foregoing operation as an offline picture on the picture tube 27. On the other hand, character data entered through the keyboard 10 is fed via the input/output controller 6 and delivered through the bus 30 to the main memory 2 under control of the processor 1. The processor 1 performs editing for the data in the main memory 2 and transfers the edited data to the code memory 12, then issues the offline expansion start command to activate the font expander 26. The font expander 26 carries out the foregoing operations to expand the given character data into a certain area of the document memory 25, and then indicates the completion of offline expansion to the processor 1. In response to this signal, the processor 1 transfers the data expanded in the document memory 25 via the main memory 2 to certain locations of the full dot memory 15, and the input characters in accordance with the offline display form are displayed over the offline picture.

During the offline operation, image data can be entered through the image scanner 8. The image data is fed via the input/output controller 4 and delivered through the bus 30 to the main memory 2. The processor 1 operates on this data and sends it to the image buffer 16. The image data loaded into the image buffer 16 is written to the full dot memory 15 addressed in correspondence to the display position, and then displayed on the picture tube 27 in the same way as mentioned above for the online operation. It is also possible to read out display data in the form of image data in the disk memory unit 11, if any, into the main memory 2 under control of the processor 1, and then display the data on the picture tube 27 in the same way as described above for the online operation.

Figure 2:
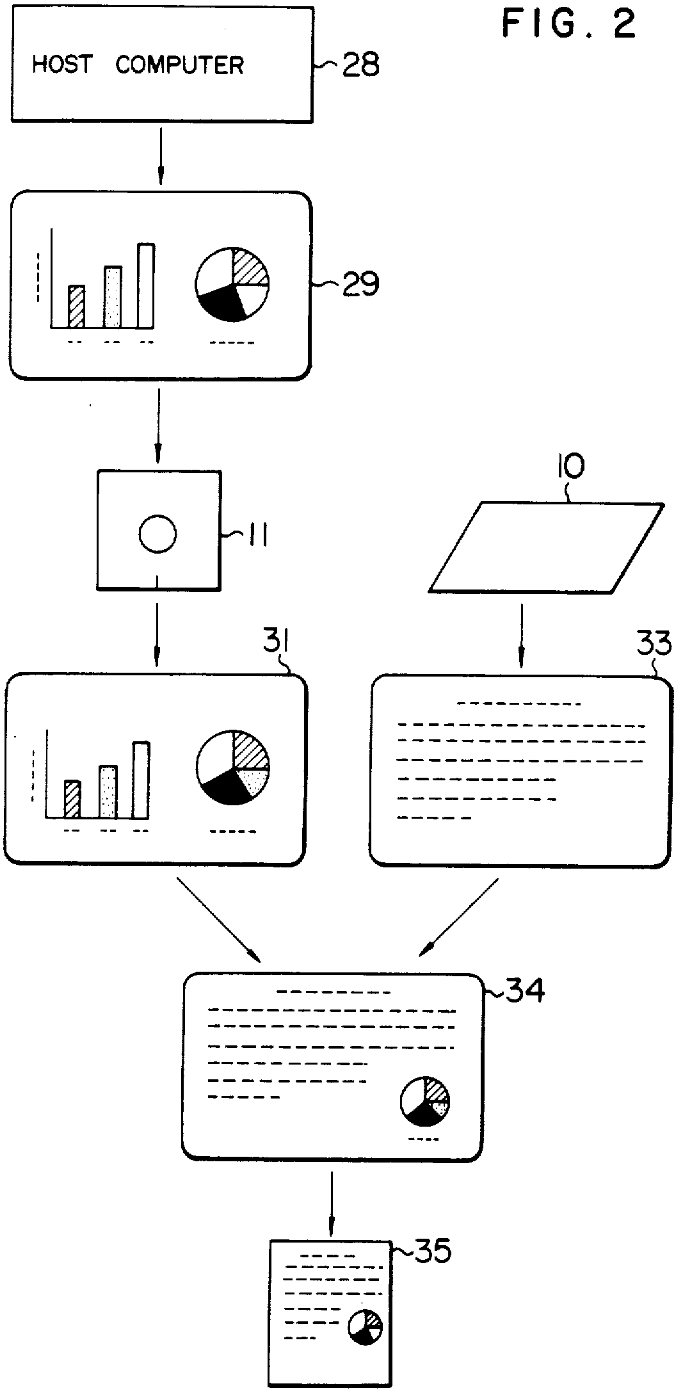
FIG. 2 is an illustration showing the application of the inventive display system.

FIG. 2 illustrates an example of usage of the inventive display system. First, display data which may include character data, graphic data and/or image data sent from the host computer 28 is displayed as an online picture 29 on the picture tube 27 through the operations described above. At the same time, the online picture 29 is expanded through the foregoing operations into image data in the document memory 25 and thereafter is stored in the disk memory unit 11.

In the offline processing, the image data in the disk memory unit 11 is read out to the main memory 2, and then transferred via the image buffer 16 to the full dot memory 15, so that it is displayed as an offline picture 31 on the picture tube 27. The offline picture 31 is identical to the online picture 29 on the picture tube 27, but the character data in both pictures are different in terms of their forms. Namely, for the online picture 29, character data is delivered to the picture tube 27 through the font display register 20 and graphic data is expanded through the vector expansion circuit 21 into dot patterns before it is displayed on the picture tube 27, whereas for the offline picture 31, both character and graphic data are treated as image data and delivered to the picture tube 27 only through the image buffer 16 and full dot memory 15. Character data entered through the keyboard 10 during the offline processing is expanded into dot patterns and stored in the document memory 25, and then fed through the full dot memory 15 and displayed as an offline picture 33.

Subsequently, the processor 1 extracts a desired portion of the offline picture 31 in the main memory 2, and after the contraction and movement operation, if required, for the part of the offline picture 31, stores it in a location of the full dot memory 15 corresponding to a blank area of the offline picture 33. Thus, a new offline picture 34 is displayed on the picture tube 27 as shown in FIG. 2. It will be appreciated from the above description that the character data displayed on the offline picture 34 has the unified offline display form. The created offline picture 34 is transferred from the document memory 25 or full dot memory 15 to the input/output controller 5, so that it is printed by the printer 9 to obtain a hard copy 35 of the picture.

As a variation of embodiment of the present invention, the font expander 26 may be deactivated during the online operation, and character data needed for the offline operation may be stored in the coded data form in the disk memory unit 11. During the offline operation, the character data in the disk memory unit 11 is transferred to the main memory 2 and then loaded to the code memory 12, and after the character data has been arranged in the offline display form using the font expander 26 and stored sequentially in the document memory 25, the dot data in the document memory 25 can be stored as image data back to the disk memory unit 11. The operation by the font expander 26 for converting the character data into dot patterns and expanding the dot patterns in the document memory 25 is the same as described above.

Consequently, in the subsequent online operation, offline display data in the disk memory unit 11 is transferred under control of the processor 1 to the document memory 25 which has not been used by the deactivated font expander 26, and part of the offline picture in the document memory 25 is extracted and written to the full dot memory 15, whereby the offline display data can be superimposed on the online picture which has been already displayed through either of the online displaying routes mentioned above.

In summary, according to the present invention, as described above, online picture data which has been stored during the online operation is transformed into the offline picture form, so that the online display data can readily be used in the offline operation.

We claim:

1. A display system operated in an on-line mode when connected with a host computer and in an off-line mode when disconnected from the host computer for displaying character data in a first display data form on a display device for an on-line operation and for displaying character data in a second display data form on said display device for an off-line operation, wherein said first and second display data forms are different from each other, comprising:

first storage means for storing character codes;

second storage means for storing dot patterns for each of said character codes;

first means coupled to said first storage means and said second storage means for reading out in the on-line mode from said second storage means the dot pattern data corresponding to the character codes read out from said first storage means;

second means coupled to said first means and said display device for converting dot pattern data read out from said second storage means during said on-line mode video signals so that said dot pattern data is displayed on said display device in said first display data form;

third storage means for storing dot patterns in said second display data form;

data transforming means coupled to said first storage means, said second storage means and said third storage means for reading out from said second storage means the dot patterns corresponding to the character codes read out from said first storage means, for converting said dot patterns to said second display data form, and for storing said converted dot patterns on a character-by-character basis in said third storage means in said second display data form, wherein the dot pattern converting and storing operation by said transforming means and the dot pattern displaying operation by said first means and said second means takes place simultaneously with each other for the same character codes stored in said first storage means during said on-line mode of operation; and third means coupled to said third storage means and said second means for sending dot patterns from said third storage means to said second means so that said dot patterns are displayed on said display device in said second display data form during said off-line mode of operation.

2. A display system operated in an on-line mode when connected with a host computer and in an off-line mode when disconnected from said host computer for displaying character data having a first display data form under control of processing means in a display device for on-line mode operation and for displaying character data having a second display data form under control of said processing means on said display device for off-line operation mode, wherein said first and second display data forms are different from each other, comprising:

first storage means for storing character codes;

second storage means for storing dot patterns for each of said character codes,;

first means coupled to sald first storage means and said second storage means for reading out in the on-line mode from said second storage means dot pattern data corresponding to the character codes read out from said first storage means;

second means coupled to said first means and said display device for converting said dot pattern data read out from said second storage means during said on-line mode into video signals so that said dot pattern data is displayed on said display device in said first display data form;

third storage means coupled to said first storage means for storing character codes read out from said first storage means under control of said processing means;

fourth storage means for storing dot patterns in said second display data form;

data transforming means coupled to said second storage means, said third storage means, and said fourth storage means for reading out in the off-line mode from said second storage means dot patterns on a character-by-character basis corresponding to the character codes stored in said third storage means, for converting said dot patterns to said second display data form, and for storing the same in said fourth storage means in the second display data form; and third means coupled to said fourth storage means and said second means for sending the dot patterns to said second means so that said dot patterns are displayed on said display device in said second display data form during said off-line mode of operation;

said processing means operation to control said first storage means so that the storing of character codes in said third storage means by said processing means and the dot pattern displaying operation by said first means and said second means are carried out simultaneously with each other for the same character code stored in said first storage means during said in-line mode of operation.

* * * * *